# UNITED STATES PATENT OFFICE.

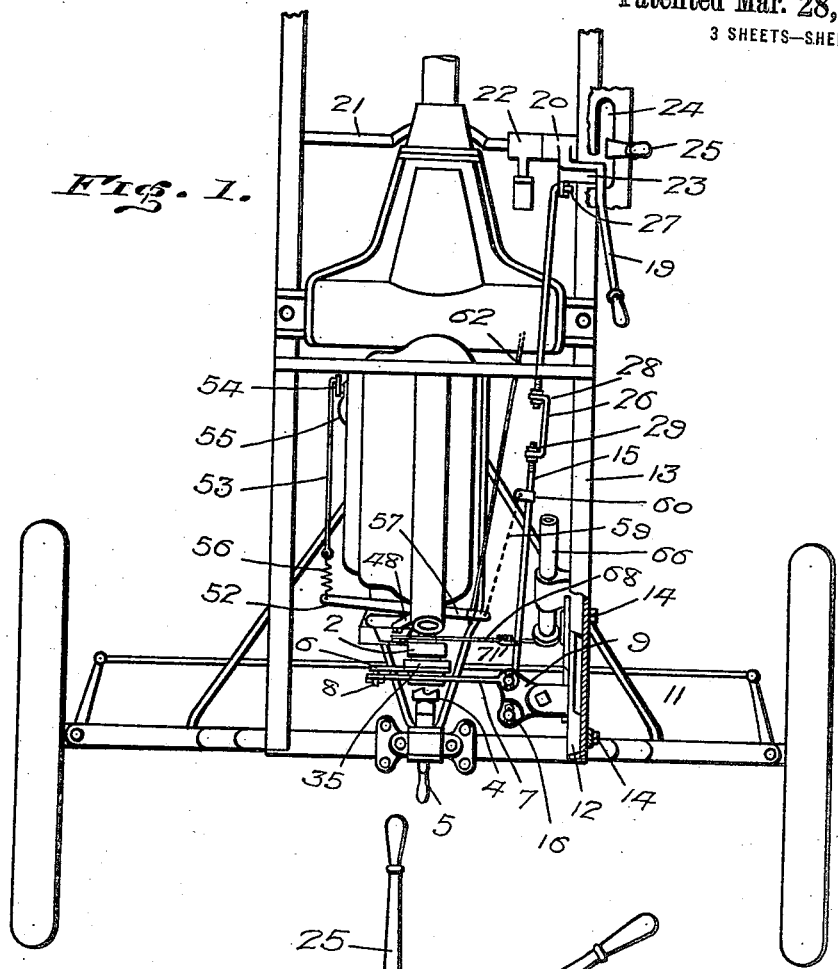
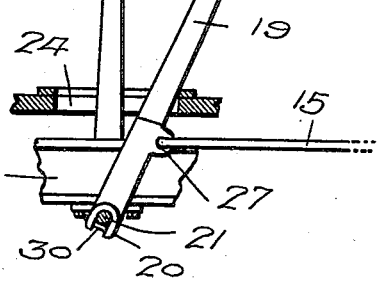
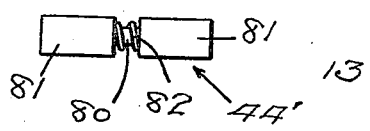
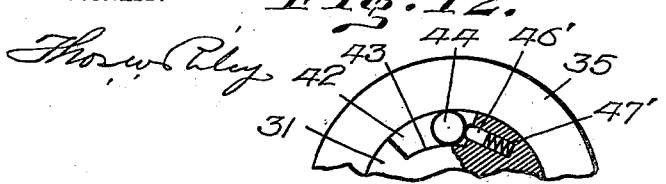

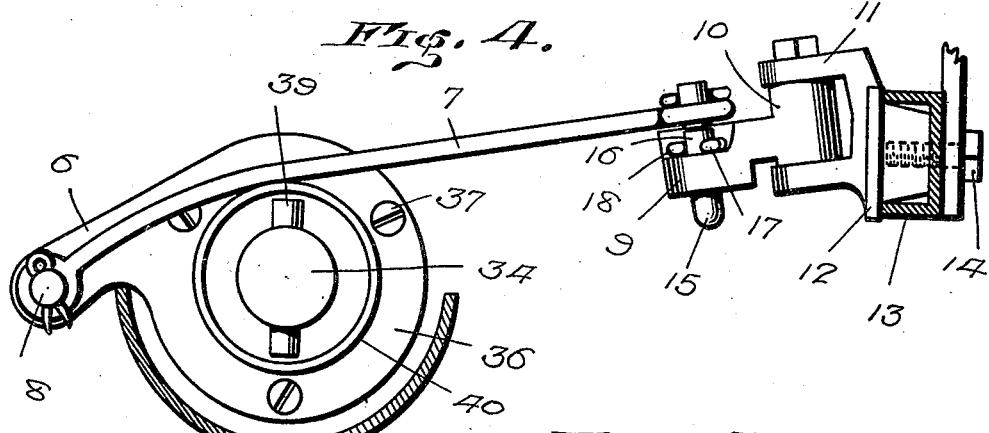

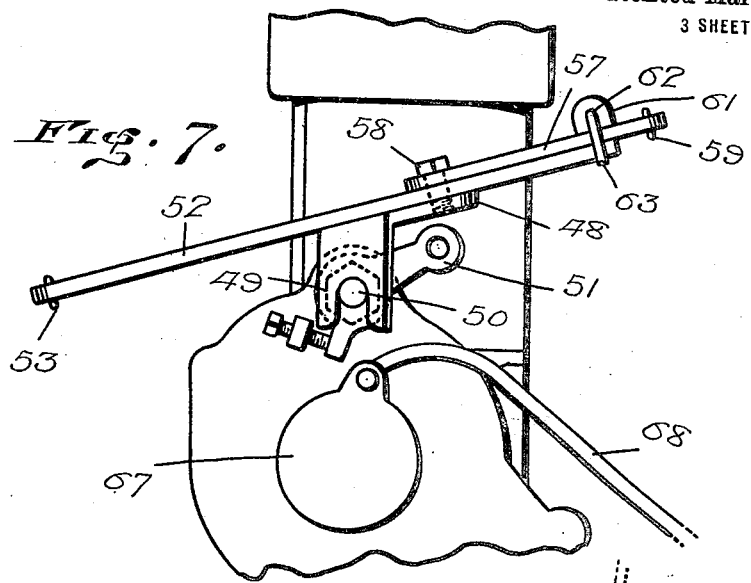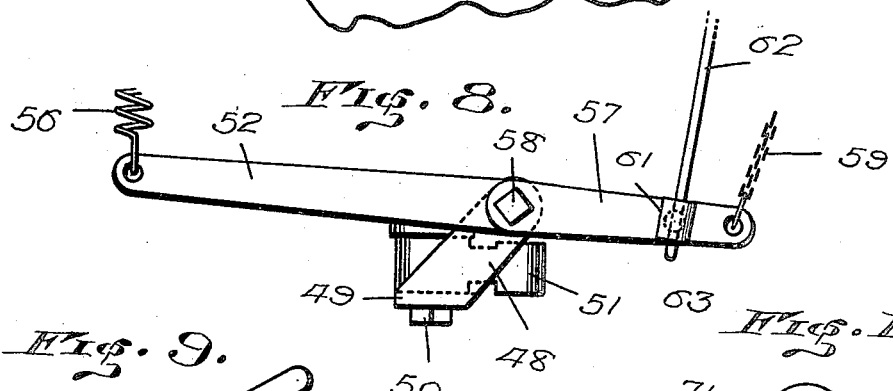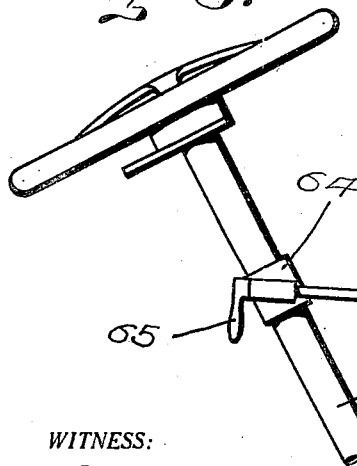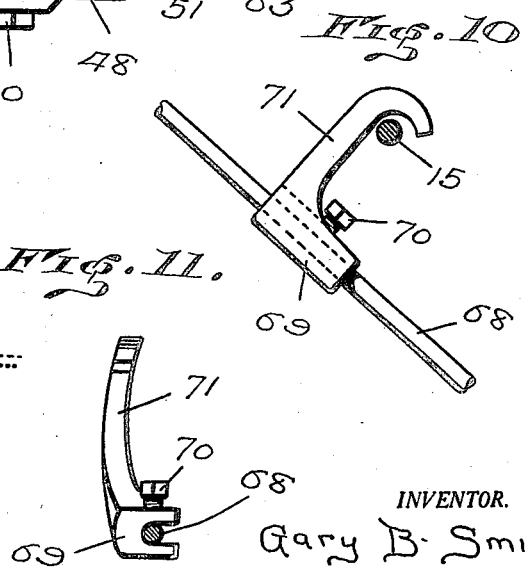

GARY B. SMITH, OF CHICAGO, ILLINOIS.

ENGINE STARTER.

1,410,613.  Specification of Letters Patent. Patented Mar. 28, 1922.

Application filed January 31, 1919. Serial No. 274,238.

*To all whom it may concern:*

Be it known that I, GARY B. SMITH, a citizen of the United States, and resident of Chicago, in the county of Cook and State of Illinois, have invented certain new and useful Improvements in Engine Starters, of which the following is a specification.

The present invention relates to engine starters for use on automobiles, and is particularly an improvement over the engine starters disclosed in my copending applications filed February 14, 1918, July 31, 1918, November 14, 1918 and December 14, 1918, Ser. Nos. 217,061, 247,538, 262,496, and 266,751, respectively.

One of the objects of the invention is the provision of a starter intended particularly for use on Ford automobiles, although it can be adapted for other motor vehicles, and comprising a novel and improved construction and assemblage of the component elements whereby the device can be quickly and easily installed without requiring a skilled mechanic, and operable from the operator's seat in order that the engine can be started conveniently by swinging a hand lever.

Another object is the provision in connection with such a starter, of novel, yet simple and inexpensive means for automatically retarding the sparks given off by the spark plugs when the engine is started, thereby avoiding the possibility of the engine backfiring.

A further object is the provision of novel and simple means combined with the starter for priming the carbureter when the engine is started, to facilitate the starting of the engine, means being provided whereby the operator can readily render the priming means operative and inoperative at will, when the starter is operated.

A still further object is the provision of novel means for transmitting the power from the hand of the operator to the engine crank shaft for conveniently and effectively starting the engine, and providing sufficient force and movement of the crank shaft to assure of the engine starting quickly.

A still further object is the provision of a novel clutch for automatically connecting the starter with the engine crank shaft for starting the engine, said clutch being of novel and improved construction so as to render it thoroughly practical and efficient.

The invention also has for its object the provision of an appliance having the characteristics above noted, and the several parts of which are so designed that they can be easily manufactured and applied to the automobile.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a fragmentary plan view of a Ford automobile showing the starter applied.

Figure 2 is an elevation showing the hand lever for starting the engine.

Figure 3 is an elevation showing the power-transmitting lever and its bracket.

Figure 4 is a front view of said lever and bracket, showing the connection of said lever with the clutch.

Figure 5 is a longitudinal section of the clutch, showing how the same can be applied to the engine crank shaft, and permitting the use of the ordinary starting crank.

Figure 6 is a face view of the clutch, showing the outer ring removed.

Figure 7 is a front view showing the lever construction of the priming device.

Figure 8 is a plan view of said lever construction.

Figure 9 is an elevation of a detail.

Figure 10 is a front view of the device used for retarding the sparks.

Figure 11 is an end view of said spark-retarding device.

Figure 12 is a view similar to Figures 6 showing a modification in the clutch.

Figure 13 is an elevation of a modified form of roller for the clutch.

In the drawings, the numeral 1 designates the crank shaft of a Ford automobile, on the forward end of which is mounted the usual fan belt pulley 2, being secured thereon by means of the usual pin 3. This pin 3 is ordinarily engaged by a ratchet 4 on the starting crank 5, it being the practice to slide the crank 5 rearwardly and then turn the same to connect the ratchet 4 with the pin 3 for rotating the engine crank shaft. This requires the operator to rotate the crank shaft from the front of the car, which is objectionable for several reasons,` and frequently, the backfiring of the engine results in serious injuries. The present starter is designed for attachment to the the crank shaft 1 of the engine, leaving the starting crank 5 in place so that it can be used when desired.

The clutch, described in detail hereinafter, has an arm 6 for turning it through an arc of nearly one half of a circle, and the power transmitting means includes a rod or link 7 having an eye at one end pivotally engaging a stud on the arm 6 and the other end of the link 7 also has an eye pivotally engaging a similar stud 8 upstanding from a power transmitting lever 9. This lever, as shown, is in the form of a wing projecting from a hub 10 pivoted for oscillation in a bracket 11 of an attaching plate 12 that is designed to fit within one side channel 13 of the automobile frame near the forward end thereof. This plate 12 is apertured for the engagement of bolts 14 used in the frame for clamping other parts thereto, so that no special provision for the attachment of the plate 12 need be made, it only being necessary to remove said bolts and then replace them after the plate 12 is moved into place. A link 15 extends longitudinally forwardly under the lever 9 and has a pintle 16 extending upwardly at an angle therefrom loosely through an aperture in the lever 9 and a pin 17 or other retaining member holds said pintle in place and is seated within a recess 18 so as not to interfere with the transverse link 7. Normally, the lever 9 projects toward the clutch with the rod or link 7 so arranged that when the lever 9 is swung rearwardly, said link is pulled toward the respective side to swing the arm 6 upward and over the axis of the shaft 1. The link 15 extends rearwardly and is so connected at its forward end to the lever 9 that when said link is pulled rearwardly, it will swing the lever 9 rearwardly and toward the corresponding side of the automobile to pull the link 7 toward said side.

A hand lever 19 or equivalent operating member is used for the manual operation of the starter, and as shown is located at the left hand side of the frame in rear of lever 9, and is provided at its lower end with a fulcrum saddle 20, of inverted U-shape which straddles and seats on the transverse rock shaft 21 of the machine. Said saddle 20 fits astride the rock shaft 21 to support the hand lever 19 for oscillation, and to enable said hand lever to be quickly and easily applied to the automobile. The saddle 20 is disposed between the speed lever 22 already on the shaft 21 and the side of the frame, thus preventing the sliding of the hand lever on said shaft, and said lever is offset, as at 23, to extend outwardly over the channel member 15 of the frame, it being noted that the fulcrum saddle 20 is located at the inner side of said member. This enables the hand lever 19 to extend upwardly through the slot 24 in the floor of the automobile body next to the brake lever 25, without cutting away said floor or otherwise altering the construction. The hand lever 19 is normally swung forward out of the way, thereby permitting the brake lever 25 to be used as usual in emergency for applying the brake, and the lever 25 does not interfere with the operation of the hand lever 19 for starting the engine. The upper terminal of the hand lever 19 is preferably extended forward at an angle, as seen in Figure 2, to render the operation more convenient, and prevent the hand from slipping from the handle when the hand lever 19 is swung rearwardly. The rear end of the link 15 has a pintle 27 pivotally engaging the lever 19 below the offset portion 23, so that when the lever 19 is swung rearwardly, this will swing the lever 9 rearwardly and sidewise. The link 15 is composed of two sections or rods having their adjacent ends adjustably connected by means of a bar 26 having its ends bent at an angle through which the adjacent ends of the link sections or rods extend, as at 28, and nuts 29 or other adjustable elements are threaded or otherwise mounted on the sections of the link 15 at opposite sides of the ears 28, and permit adjustment of the link 15 to take up loose play and provide for the proper operation of the starter. It is evident that when the hand lever 19 is swung rearwardly, this will pull the rod or link 15 rearwardly with considerable force or purchase, thereby swinging the lever 9 and pulling the link 7 to turn the clutch arm 6. It is preferable to provide a cotter pin 30 or other retaining element for holding the fulcrum saddle 20 on the rock shaft 21, although this is optional.

The clutch is designed for attachment to the crank shaft 1 of the engine, and is provided with means whereby the starting crank 5 can be employed as usual for rotating the shaft 1, if desired. This clutch comprises a body member 31 having a rearwardly extending sleeve 32 to fit on the hub of the pulley 2, and said sleeve is apertured for the reception of the pin 3 so that said pin also secures the member 31 to the shaft 1. This member has a collar 33 and a central forwardly projecting stud 34. A ring 35 is mounted for turning movement on the collar 33 and extends behind said collar, while a ring 36 is disposed in front of the collar 33 around the stud 34 and is secured to the ring 35 by means of screws 37 or the like. It is also preferable to provide the ring 36 with lugs 38 entering recesses in the ring 35 to lock the two rings together and take the shearing strain off of the screws 37. The rings 35 and 36 thus loosely embrace the member 31 astride the collar 33 so that said member and rings can rotate relatively. The arm 6 of the clutch is a projection of the ring 36, so that when the arm 6 is swung upwardly over the axis of the shaft 1, this will rotate the rings 35 and 36. A pin 39 is engaged through the stud 34 and provides means for the engagement of the ratchet 4 of the starting crank 5, instead of said ratchet engaging the pin 3. Thus, by pushing the crank 5 rearwardly, the ratchet 4 engages the pin 39 around the stud 34, and said starting crank is thus connected with the engine crank shaft 1 for turning the same in the ordinary manner, when this is desired or necessary. The ring 36 has a forwardly projecting annular flange 40 forming a housing surrounding the pin 39 and stud 34, and said flange 40 has an opening 41 through which the pin 39 can be inserted and removed.

In order to rotate the member 31 with the rings 35 and 36 when the arm 6 is swung for starting the engine, and to permit the member 31 to rotate with the engine shaft 1 while the engine is running, the collar 33 is provided with recesses 42, the bottom walls of which are eccentric to provide cams 43 confronting the inner surface of the ring 35, and a roller 34 is disposed transversely in each recess 42 to bind with a wedge fit between the cams 43 and ring 35. Said cams are so arranged that when the ring 35 is rotated for starting the engine, the rollers 34 will bind between the ring and member 31, thus rotating the member 31 with the ring 35 and therefore rotating the shaft 1, and when the engine is started and the member 31 continues to rotate with the shaft 1, the rollers 34 will be located adjacent to the deeper ends of the recesses 42. This provides a ratchet clutch whereby the member 31 is gripped and rotated when the hand lever 19 is swung for starting the engine, and when said hand lever is returned or the member rotated by the engine, the grip is released.

In order to prevent the cylindrical surfaces of the rollers 44 rubbing against the ring 35 and becoming worn, during the operation of the engine, means is provided for endwise pressure between the rollers and rings 35 and 36, so as to keep said rollers against the shoulders at the deeper ends of the recesses 42 out of contact with the ring 35. Thus, the ring 36 can be provided with an annular groove 45 into which the forward ends of the rollers 44 project against a wear ring 46 in said groove, and a suitable spring 47′ is disposed behind the ring 46 in the groove to press said ring against the forward ends of the rollers 44, thereby pressing the rear ends of the rollers against the ring 35. Thus, when the rings 35 and 36 are turned, the rollers 44 will be moved with them due to the frictional engagement of the ends of the rollers with the rings, and this will, by a very slight movement and without appreciable lost motion, bind the rollers 44 between the member 31 and ring 35 so that the member 31 will be rotated. Then, when the member 31 is rotated with the engine crank shaft 1 after the engine has started to operate, the shoulders of the member 31 will strike the rollers 44 and carry them around with the member 31, and the friction between the ends of the rollers and the rings will hold the rollers 44 longitudinal and back to keep them out of contact with the ring 35, thus preventing the rollers from wearing flat. In this manner, the rollers 44 which are kept in motion during the operation of the engine, are prevented from wearing on their cylindrical surfaces, as would be the case if said rollers were kept in contact with the ring 35, and the only wear will be on the ends of the rollers, but such wear will not disturb the operation of the clutch, and will be taken up by the spring 47.

The priming device embodies a bracket 48 having at its forward end a depending slotted ear 49 to be moved downwardly onto the pivot bolt 50 which is used for supporting the fan bracket 51, said ear being clamped between said bracket and the head of the bolt 50. The bracket 48 extends rearwardly and upwardly at an angle, and supports a transverse lever 52 which has one arm connected by a rod or wire 53 with the priming lever 54 of the carbureter 55, a spring 56 being interposed in the rod 53 to permit of stretching or yielding motion when the lever 54 has been moved its allotted distance, and permitting the lever 52 to move further.

The priming device embodies means operated by the starter and under manual control of the operator whereby the priming device can be brought into and out of operation at will during the operation of the starter, in order that when the priming of the carbureter is not wanted, such as in hot weather, or when the starter has been operated several times in succession, as might cause flooding of the carbureter, or when the engine is already heated, the device can be readily set by hand to prevent priming when the starter is operated, and when priming action is desired, this is readily accomplished by the simple turn of a handle before the starter is operated. For this purpose, a lever 57 works above the arm of the lever 52 opposite to the rod 53 and engages the pivot 58 of the lever 52 which is supported by the bracket 48, and the lever 57 is connected by a chain 59 or its equivalent with the rod 15, such as by means of a clamp 60, so that whenever the hand lever is swung rearwardly for starting the engine, this will pull the chain 59 and lever 57 rearwardly also. Thus, the lever 57 is oscillated whenever the starter is operated, and means is provided for connecting and disconnecting the levers 52 and 57 under manual control. A block 61 is pivotally mounted on the lever 57 and the forward terminal of a rod 62 is journaled through the block 61 and has an angularly extending finger 63 in front of the levers.

This rod 62 extends rearwardly through the dash to the steering column 66, and the rear terminal of said rod is journaled in a suitable support and guide 64 applied to the steering column in any suitable manner. A handle 65 is attached to the rear end of the rod 62 and is preferably disposed in the same position as the finger 63 to indicate the position thereof to the operator. The rod 62 is movable with the block 61 and is reciprocated when the lever 57 is oscillated. Therefore, when the rod 62 is turned with the finger 63 extending downwardly, said finger will contact with the lever 52 and swing said lever when the lever 57 is swung rearwardly, thus pulling the rod 53 forwardly and swinging the priming lever 64 to prime the carbureter when the starter is operated. However, when the finger 63 is swung to project upwardly it will not contact with the lever 52, so that the priming device will not function. The operator can therefore readily bring the priming means into and out of operation by simply turning the handle 65 at will before moving the hand lever to start the engine. In such conditions when the priming of the carbureter is not wanted, the handle 65 is turned to disconnect the actuating means from the priming device, thus avoiding flooding of the carbureter or waste of fuel.

The ignition system is controlled by the operation of the starter, so that the sparks will be retarded when the starter is brought into operation, thus preventing the engine from backfiring. This device makes use of the commutator or timer 67 which controls the ignition system to retard and advance the sparks as well known, said commutator having a rigging mounted for rocking movement and connected by a rod or link 68 with the spark control at the lower end of the steering column 66, as usual. In controlling the sparks, the link 68 is moved back and forth, to thereby adjust the commutator 67, it being noted that the rods or links 15 and 68 cross one another, and this is taken advantage of to operate the commutator automatically when the starter is actuated. To accomplish this, a clamp 69 of U-shape or other suitable form is fitted on the link 68, and is secured thereto by means of set screws 70 or the like, and said clamp has a finger 71 projecting across the link 15 and so positioned that said finger is moved toward or against the link 15 when the spark is advanced. Therefore, when the rod or link 15 is pulled rearwardly, to operate the starter, the forward end thereof in moving with the lever 9, will not only move rearwardly, but will also move inwardly as it swings or moves around the center of the lever 9, and, therefore, should the commutator 67 be set with the sparks advanced, the link 15 will contact with the finger 71 and move same inwardly. This will shift the link 68 inwardly and operate the commutator for retarding the sparks. This will avoid backfiring, and when the hand lever is swung forwardly and the link 15 returned to normal position, the spark control can be operated as usual without interference.

It will be noted that the priming device provides not only for the priming of the carbureter by the operation of the starter and the usual priming action, but the rod 62 can also be operated by hand from the operator's seat when desired to prime the carbureter.

Figure 12 shows the rollers 44 as being pushed tight between the ring 35 and cams 43 by plungers 46' having springs 47' behind them instead of using the end friction against the rollers.

Figure 13 shows another mode of obtaining the end friction of the rollers by using special rollers 44' comprising tubular sections 80 on a pin 81 separated by a spring 82 so that the ends of the roller contact frictionally with the rings 35 and 36 without using the rings 46 and 47.

Having thus described the invention, what is claimed as new is:—

1. An engine starter for automobiles embodying a clutch member to connect with an engine shaft, a wing shaped lever fulcrumed at one side of said clutch member and projecting toward it from the fulcrum, a link connecting said clutch member and rear portion of the lever to move in the rear of the fulcrum when the lever is swung rearwardly, a hand lever mounted in rear of the first named lever, and a link operated by the handle lever and connected to the forward portion of the first named lever in front of the first named link, said links being above and below respectively of said lever to be separated thereby and crossing one another when the lever is swung.

2. The combination with an engine and an ignition control therefor, including a rod movable back and forth to advance and retard the sparks, of a starter for the engine including a rod movable back and forth, said rods crossing one another at an angle, and means between said rods whereby the movement of the starter rod will shift the ignition rod to retard the sparks.

3. The combination with an engine and an ignition control therefor having a rod movable back and forth to advance and retard the sparks, of a starter for the engine including a rod movable back and forth and transversely during longitudinal movement, said rods crossing one another, and a finger carried by the first named rod for the contact of the second named rod by its transverse movement for moving the ignition control to retard the sparks when the starter is operated.

4. An engine starter embodying rotatable members, one having means for attachment to an engine shaft, means for turning the other member, a gripping roller between said members, one member having a recess for said roller with a cam surface, and means providing endwise friction between the ends of said roller and the other member.

5. An engine starter embodying a clutch comprising two members, one rotatable on the other, one member having means for attachment to an engine shaft, means for turning the other member, one member having a recess with a cam surface confronting the other member, a roller in said recess to bind between the two members, and spring means for providing friction between the ends of the roller and that member confronted by said cam surface.

6. The combination with an engine, and a primer therefor, of a starter for starting the engine, a movable member connected to the primer, a second movable member operated by the starter, and manually-controlled means for operatively connecting and disconnecting said members for the movement of the first named means by the starter and also by the manually-controlled means.

7. The combination with an engine and a primer therefor, of a starter for the engine, means for operating the primer, means operated by the starter, and manually operable means for connecting and disconnecting said first named and second named means for operating the primer from the starter.

8. The combination with an engine and a primer therefor, of a starter for the engine, a movable member connected to the primer to operate it, a second movable member operated by the starter, and manually controlled means whereby the first named member is moved by the second named member at will.

9. The combination with an engine and a primer therefor, of a starter for the engine, a lever connected to the primer for operating it, a second lever movable adjacent to the first named lever and operated by the starter, and a rotatable rod movable with one lever to be rotated by hand and having means movable to be engaged with the other lever for operating the first named lever with the second lever to operate the primer when desired.

In witness whereof I hereunto set my hand.

GARY B. SMITH.